United States Patent
Shibata et al.

(10) Patent No.: US 10,873,156 B2
(45) Date of Patent: Dec. 22, 2020

(54) CONNECTOR AND CONNECTOR ASSEMBLY

(71) Applicant: Molex, LLC, Lisle, IL (US)

(72) Inventors: Shinsuke Shibata, Yamato (JP); Masahiro Yamamoto, Yokohama (JP)

(73) Assignee: Molex, LLC, Lisle, IL (US)

(*) Notice: Subject to any disclaimer, the term of this patent is extended or adjusted under 35 U.S.C. 154(b) by 273 days.

(21) Appl. No.: 15/735,702

(22) PCT Filed: Jul. 7, 2016

(86) PCT No.: PCT/US2016/041235
§ 371 (c)(1),
(2) Date: Dec. 12, 2017

(87) PCT Pub. No.: WO2017/011254
PCT Pub. Date: Jan. 19, 2017

(65) Prior Publication Data
US 2020/0044389 A1     Feb. 6, 2020

(30) Foreign Application Priority Data

Jul. 10, 2015   (JP) ................................. 2015-139053

(51) Int. Cl.
*H01R 13/629*   (2006.01)
*H01R 13/52*    (2006.01)

(52) U.S. Cl.
CPC ... *H01R 13/62933* (2013.01); *H01R 13/5219* (2013.01)

(58) Field of Classification Search
CPC ........ H01R 13/62977; H01R 13/62955; H01R 13/62938; H01R 13/62944;
(Continued)

(56) References Cited

U.S. PATENT DOCUMENTS

| 6,905,355 B2 | 6/2005 | Fukamachi |
| 7,070,438 B2 * | 7/2006 | Dillon ............. H01R 13/62977 439/157 |

(Continued)

FOREIGN PATENT DOCUMENTS

| JP | H06-215827 A | 8/1994 |
| JP | 2009-059510 A | 3/2009 |
| WO | 2017/011254 A1 | 1/2017 |

OTHER PUBLICATIONS

International Search Report and Written Opinion received for PCT application No. PCT/US2016/041235 dated Oct. 19, 2016, 9 pages.
(Continued)

*Primary Examiner* — Edwin A. Leon
*Assistant Examiner* — Matthew T Dzierzynski

(57) ABSTRACT

A female connector is connected to a male connector having a cylindrical hood portion open in the longitudinal direction and housing a plurality of terminals. The male connector has a holding portion holding a plurality of terminals arranged inside the hood portion when the female connector is connected to the male connector, a seal interposed between the outer surface of the holding portion and the inner surface of the hood portion, and a slider arranged along the outer surface of the hood portion. The slider is able to slide in the transverse direction and the sliding action causes the hood portion to be engaged so that force is applied to the hood portion in the direction in which the male connector connects to the female connector. A pressing portion is formed on the slider to press the hood portion into the holding portion.

10 Claims, 8 Drawing Sheets

(58) Field of Classification Search
CPC ........ H01R 13/62922; H01R 13/62933; H01R 13/62911; H01R 13/62927; H01R 13/6295; H01R 13/5208; H01R 13/502; H01R 13/506; H01R 13/641; H01R 13/62961; H01R 2201/26
See application file for complete search history.

(56) References Cited

U.S. PATENT DOCUMENTS

| | | | | |
|---|---|---|---|---|
| 7,618,271 | B2 * | 11/2009 | Shiga | H01R 13/62977 439/157 |
| 7,931,483 | B2 * | 4/2011 | Komiyama | H01R 13/62977 439/157 |
| 8,235,742 | B2 * | 8/2012 | Komiyama | H01R 13/62977 439/157 |
| 8,439,695 | B2 * | 5/2013 | Komiyama | H01R 13/62944 439/157 |
| 9,225,104 | B2 * | 12/2015 | Suzuki | H01R 13/5208 |
| 2005/0221653 | A1 | 10/2005 | Dillon | |
| 2006/0040535 | A1 | 2/2006 | Koshy et al. | |
| 2010/0081313 | A1 | 4/2010 | Komiyama et al. | |
| 2011/0237109 | A1 | 9/2011 | Komiyama | |
| 2011/0312198 | A1 | 12/2011 | Komiyama et al. | |
| 2014/0242820 | A1 | 8/2014 | Suzuki | |

OTHER PUBLICATIONS

International Preliminary Report on Patentability received for PCT Application No. PCT/US2016/041235, dated Jan. 25, 2018, 8 pages.
Notification of Reasons for Refusal received for Japanese Patent Application No. 2015-139053, dated May 29, 2018, 7 pages. (3 pages of English Translation and 4 pages of Official Copy).

* cited by examiner

CONNECTOR AND CONNECTOR ASSEMBLY

RELATED APPLICATIONS

This application claims priority to PCT Application No. PCT/US2016/041235, filed Jul. 7, 2016, which claims priority to Japanese Application No. 2015-139053, filed Jul. 10, 2015, both of which are incorporated herein by reference in their entireties.

TECHNICAL FIELD

The present disclosure relates to a connector and a connector assembly.

BACKGROUND ART

Patent Document 1 relates to waterproof connectors in which a male connector is mated with a female connector. The male connector has a hood opening in front (the cylindrical mating portion 11 in Patent Document 1). When mated with the female connector, the hood is accommodated in space between the housing of the female connector (the hood portion 21 in Patent Document 1) and a holding portion holding the terminals on the female connector (the tower portion 22 in Patent Document 1). A seal (the sealing portion 23 in Patent Document 1) is provided between the holding portion and the hood accommodated in the housing of the female connector. The seal closes the gap between the male and female connectors and provides a waterproof seal between the connectors.

Patent Document 1: Laid-Open Patent Publication No. 2004-311190

SUMMARY

In connectors with this type of seal, when the seal is pushed into the hood, the hood itself bulges. When the hood bulges, the seal and hood may not adhere to each other well, and the waterproof performance of the male and female connector may deteriorate.

Also, when such a seal is provided, the seal is brought into contact with the hood and frictional resistance occurs when the operator mates the male connector with the female connector. As a result, considerable force is required to mate the male and female connectors.

It is an object of the present disclosure to enable the easy mating of connectors without causing the hood to bulge.

The present disclosure is a connector connected in a first direction to another connector having a cylindrical hood open in the first direction and housing on the inside a plurality of terminals, the connector comprising: a holding portion for holding the plurality of terminals inside the hood when connected to the other connector; a seal interposed between the outer surface of the holding portion and the inner surface of the hood when connected to the other connector; a slider arranged along the outer surface of the hood when the holding portion is housed inside the hood, the slider able to slide in a second direction orthogonal to the first direction and to engage the hood so that the slider sliding in the second direction causes the other connector to apply pressing force to the hood in the direction of connection to the connector; and a pressing portion formed in the slider to press the hood towards the holding portion. In this way, the connectors can be easily mated without causing the hood to bulge.

In one aspect of the present disclosure, the slider has a plurality of pressing portions arranged at a predetermined interval from each other in the second direction serving as the pressing portion.

In another aspect of the present disclosure, the slider engages an engaging portion provided on the outer surface of the hood, and has a plurality of grooves for guiding the holding portion into the hood when the slider moves in the second direction.

In another aspect of the present disclosure, the slider engages an engaging portion provided on the outer surface of the hood, and has a plurality of grooves for guiding the holding portion into the hood when the slider moves in the second direction.

In another aspect of the present disclosure, the pressing portion is arranged at a position closer to the leading end opening into the hood than a position where the seal is arranged.

In another aspect of the present disclosure, the pressing portion protrudes in a third direction orthogonal to the first direction and the second direction, and has an inclined surface extending in the first direction and the third direction.

In another aspect of the present disclosure, the connector has two sliders serving as the slider, the two sliders each having a surface facing the other in a third direction orthogonal to the first direction and the second direction so as to interpose the holding portion, and pressing portions are formed on the surfaces of the two sliders facing each other.

The present disclosure is also a connector assembly including a connector connected to another connector in a first direction, and the other connector having a cylindrical hood open in a first direction and housing on the inside a plurality of terminals, the connector comprising: a holding portion for holding the plurality of terminals inside the hood when connected to the other connector; a seal interposed between the outer surface of the holding portion and the inner surface of the hood when connected to the other connector; a slider arranged along the outer surface of the hood when the holding portion is housed inside the hood, the slider able to slide in a second direction orthogonal to the first direction and to engage the hood so that the slider sliding in the second direction causes the other connector to apply pressing force to the hood in the direction of connection to the connector; and a pressing portion formed in the slider to press the hood towards the holding portion.

In one aspect of the present disclosure, the pressing portion presses against the outer surface of the hood as the slider slides in the second direction and the other connector moves in the direction connecting to the connector.

In another aspect of the present disclosure, the pressing portion does not apply pressure to the outer surface of the hood when the hood is housed inside the connector but the slider sliding in the second direction has not moved the other connector in the direction connecting to the connector.

DETAILED DESCRIPTION OF THE PREFERRED EMBODIMENTS

Figure 1:
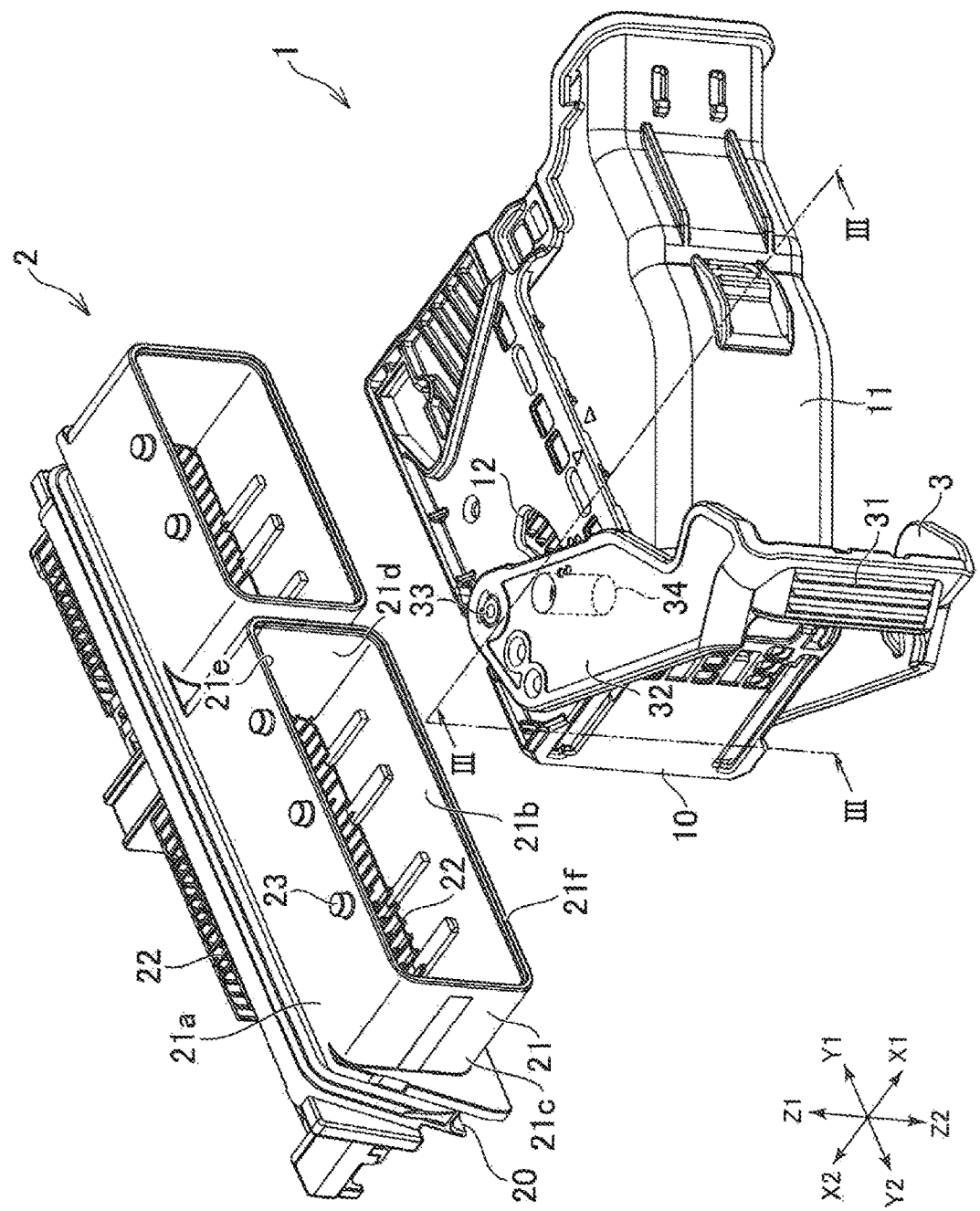
FIG. 1 is a perspective view of a male connector and a female connector in an embodiment of the present disclosure.
Figure 2:
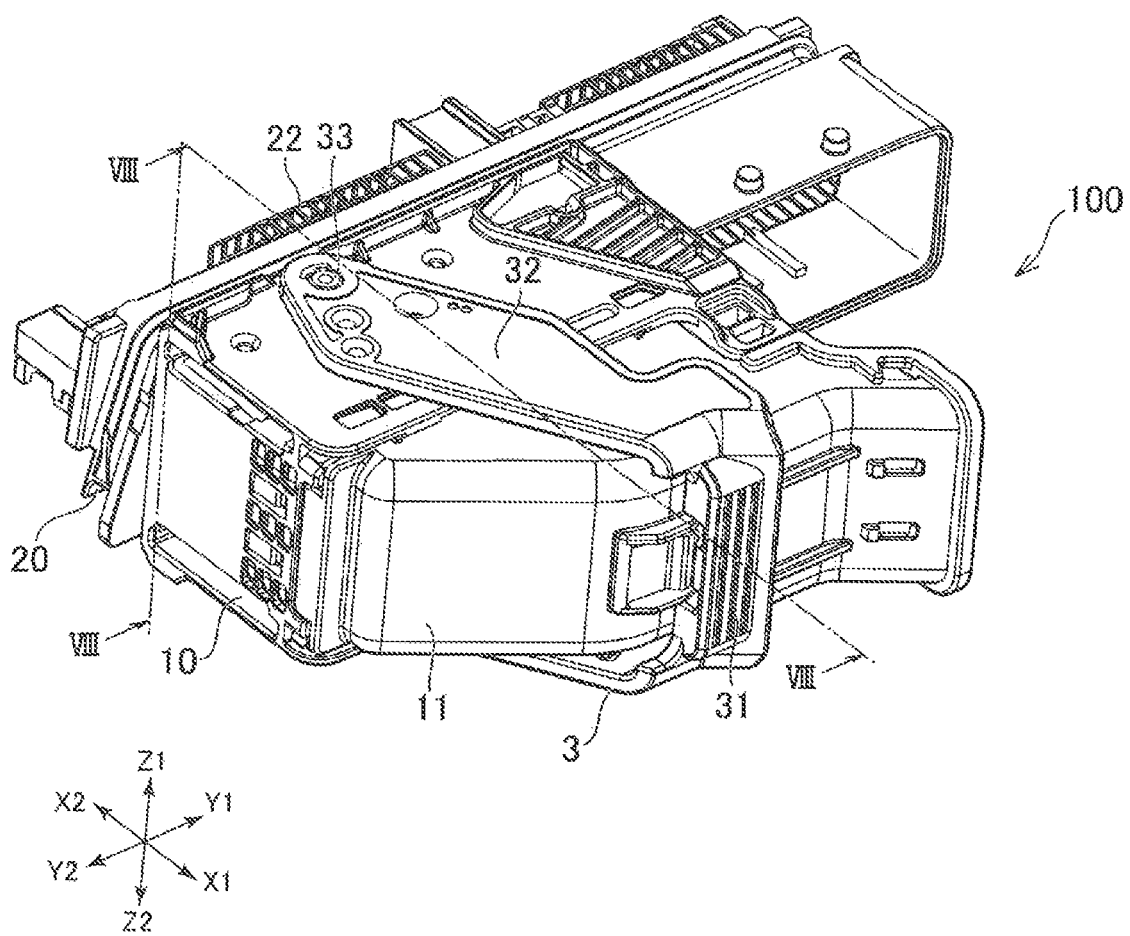
FIG. 2 is a perspective view of the connector assembly.
Figure 3:
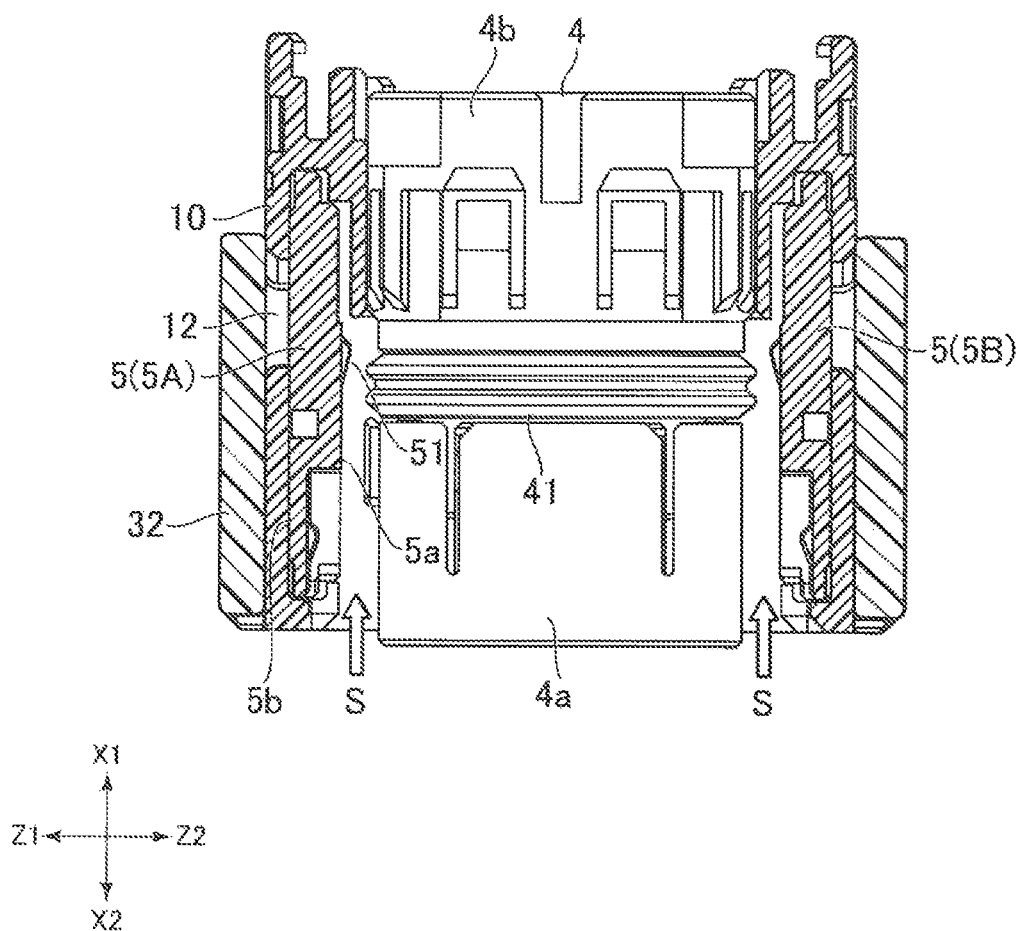
FIG. 3 is a cross-sectional view of the female connector.
Figure 4:
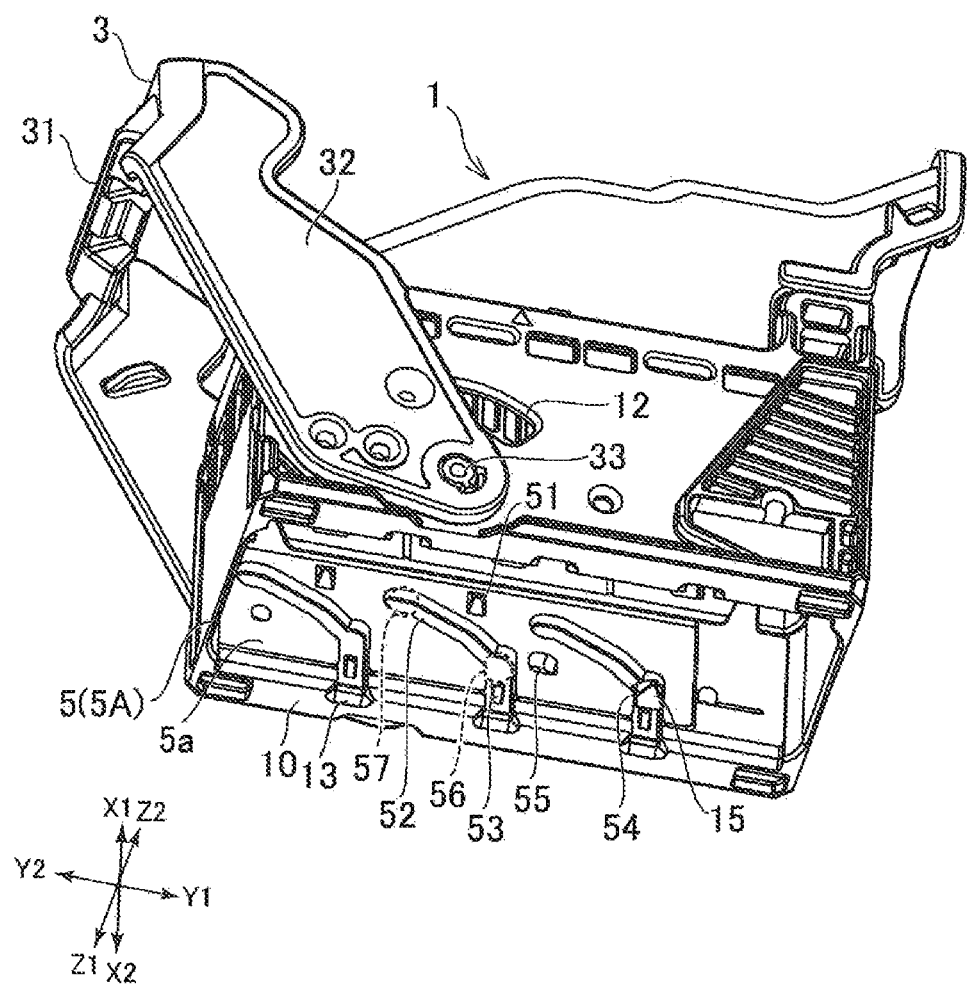
FIG. 4 is a perspective view of the female connector.
Figure 5:
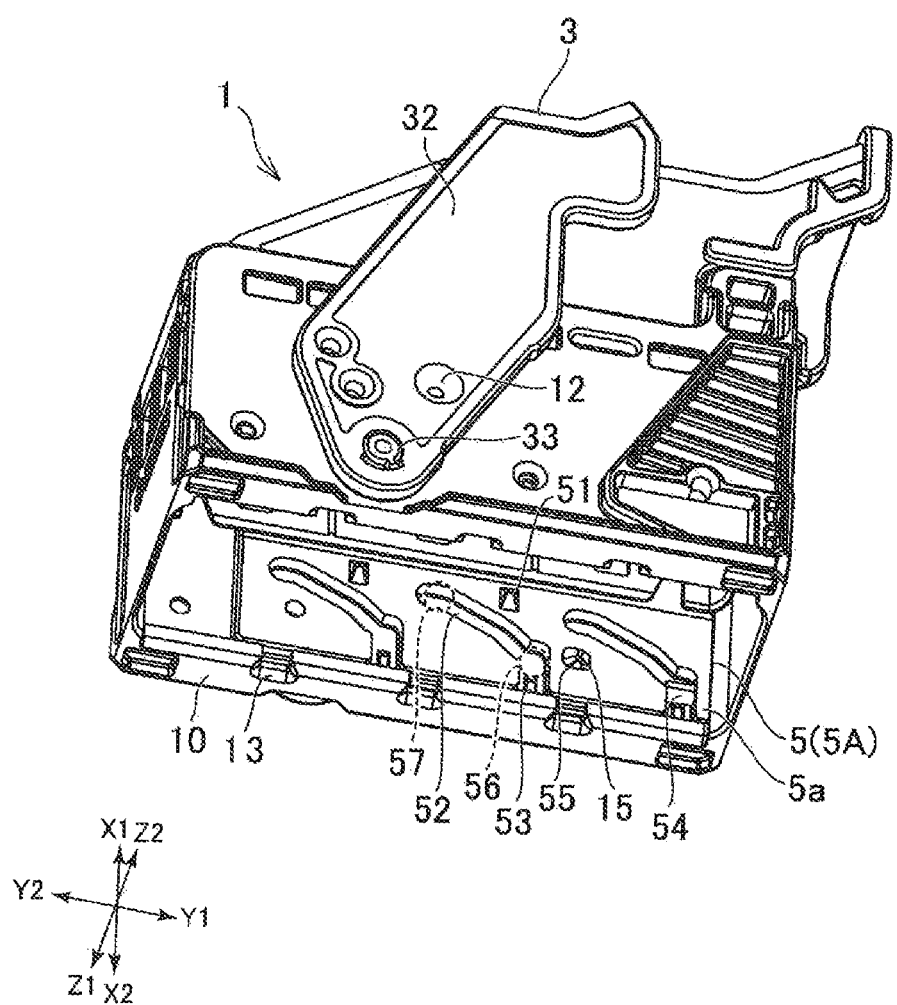
FIG. 5 is a perspective view of the female connector.
Figure 6:
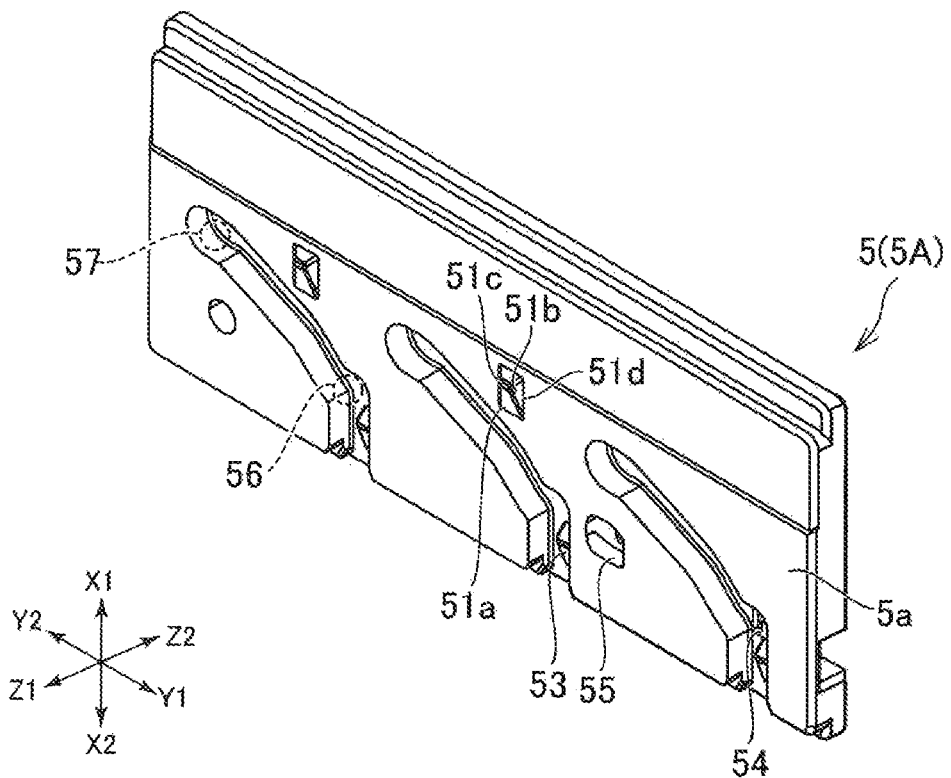
FIG. 6 is a perspective view of the slider.
Figure 7:
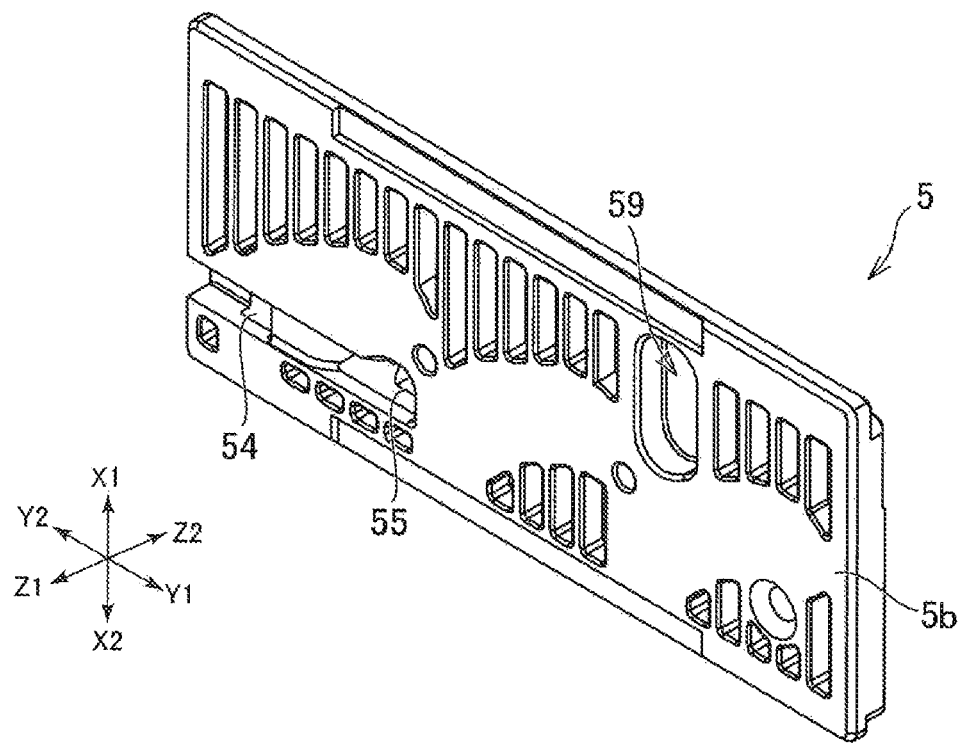
FIG. 7 is a perspective view of the slider.
Figure 8:
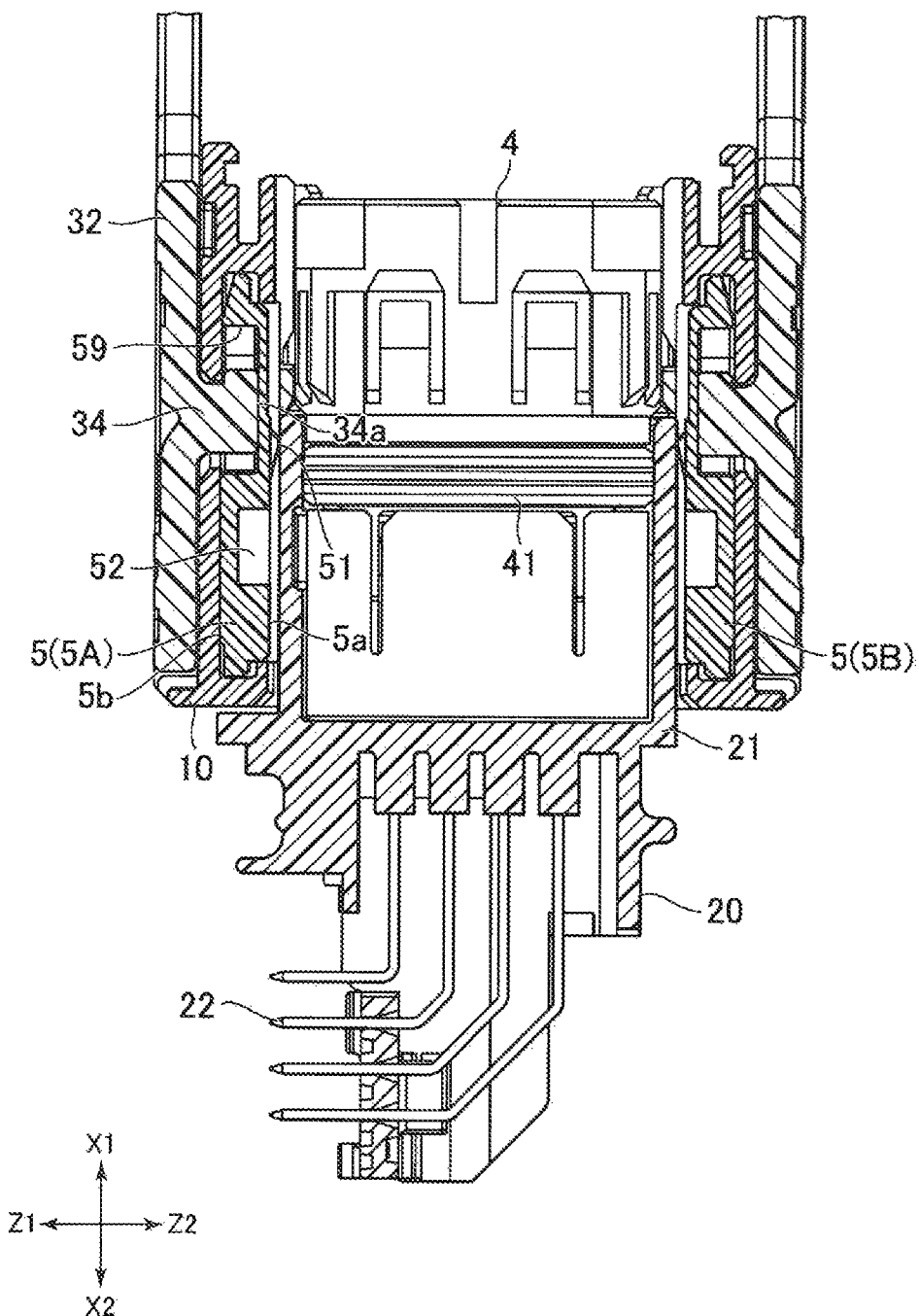
FIG. 8 is a cross-sectional view of the connector assembly.

The following is an explanation of modes of embodying the present disclosure (referred to below as embodiments) with reference to FIG. 1 through FIG. 8. FIG. 1 is a perspective view of an example of an embodiment of the present disclosure (referred to below simply as an embodiment) showing the female connector 1 and the male connector 2 prior to mating. FIG. 2 is a perspective view showing the connector assembly 100 after the female connector 1 and the male connector 2 have been assembled. FIG. 3 is a cross-sectional view of the female connector 1, and the cross-sectional view is from line III-III in FIG. 1. FIG. 4 and FIG. 5 are perspective views of the interior of the female connector 1. FIG. 6 is a perspective view showing the front surface of the slider 5 built into the female connector 1. FIG. 7 is a perspective view showing the rear surface of the slider 5. FIG. 8 is a cross-sectional view of the mated female connector 1 and male connector 2, and the cross-sectional view is from line VIII-VIII in FIG. 2.

In the following explanation, the directions indicated by X1 and X2 in each drawing denote, respectively, the front and rear directions. The directions indicated by Y1 and Y2 in each drawing denote, respectively, the left and right directions. Also, the directions indicated by Z1 and Z2 in each drawing denote, respectively, the up and down directions. In each embodiment, the X-axis direction is the 'first direction' of the present disclosure, the Y-axis direction is the 'second direction' of the present disclosure, and the Z-axis direction is the 'third direction' of the present disclosure. The present disclosure is not limited to these directions.

As shown in FIG. 1, the female connector 1 includes a housing 10 and a lever 3. The housing 10 has upper, lower, left, and right side walls, and an opening on the rear side for receiving the male connector 2. A cover 11 is attached to the front side of the housing 10 for guiding a wire bundle (not shown).

The lever 3 is mounted so that the housing 10 is interposed from the outside vertically. The lever 3 can be rotated around a support shaft portion 33 and the rotational range is limited by the size of the arc-shaped shaft holes 12 passing through the upper and lower side walls of the housing 10. More specifically, as shown in FIG. 1 and FIG. 8, an extended portion 34 is formed in the support shaft portion 32 connected to the grip 31 and support shaft portion 33 of the lever 3 which extends in the vertical direction (transverse direction in FIG. 8) and passes through the shaft holes 12. The rotational range of the lever 3 is limited by the extended portion 34 coming into contact with the edges of the shaft holes 12.

Also, as shown in FIG. 1, the male connector 2 includes a housing 20, a plurality of terminals 22 passing through the housing 20 and extending in the longitudinal direction, and a cylindrical hood portion 21 opening in the longitudinal direction and housing a plurality of terminals 22 inside. The hood portion 21 has a substantially rectangular profile and includes an upper side panel 21a, a lower side panel 21b, a left side panel 21c, and a right side panel 21d. Each terminal 22 in the male connector 2 is bent towards the rear, has a portion extending in the vertical direction, and is connected to a board (not shown) on the lower end. Column-shaped engaging portions 23 are formed on the outer surfaces of the upper and lower side panels 21a, 21b of the hood portion 21 and protrude vertically. The engaging portions 23 are angular columns, and one or more engaging portions can be formed.

As shown in FIG. 2, the female connector 1 is connected to the male connector 2 on the rear side. In other words, the female connector 1 and the male connector 2 are mated with each other to form a connector assembly 100. After the female connector 1 has been inserted from the front side of the male connector 2, the operator can push the lever 3 to the right side (that is, to the Y1 side) to mate the female connector 1 and the male connector 2 to each other. Here, the lever 3 can be rotated from the release position (see FIG. 1), at which the male connector 2 can be inserted and removed, and the locked position, at which the male connector 2 is mated and cannot be dislodged (see FIG. 2). When the female connector 1 and the male connector 2 are mated with each other, the terminals (not shown) on the female connector 1 make contact with the terminals 22 on the male connector 2, and an electrical connection is established between the female connector 1 and the male connector 2.

FIG. 3 is a cross-sectional view of the female connector 1, but the holding portion 4 and the seal 41 are not shown in cross-section. As shown in FIG. 3, the holding portion 4 for holding the terminals (not shown) on the female connector 1 is attached inside the female connector 1. The holding portion 4 has an angular column shape and extends in the longitudinal direction (the vertical direction in FIG. 3). More specifically, the holding portion 4 has an accommodated holding portion 4a formed in the rear side and accommodating the hood portion 21, and a secured holding portion 4b formed in the front side for securing the terminals on the male connector 2 (not shown) in the holding portion 41. The accommodated holding portion 4a and the secured holding portion 4b are integrally formed, and a ring-shaped seal 41 is formed in the center of the outer peripheral surface in the longitudinal direction along the entire periphery. The seal 41 is a mound protruding from the surface on the holding portion 4 in the circumferential direction (two mounds in the present example), which is compressed by the inner surface of the hood portion 21. In the present embodiment, the seal 41 is made of an elastic material such as rubber and can be removed from the housing 10. However, the seal 41 is not restricted to this example.

A plurality of holes (not shown) are formed in the rear surface of the holding portion 4 (the lower surface in FIG. 3), and the terminals of the female connector 1 (not shown) are arranged inside these holes. When the female connector 1 and the male connector 2 are connected to each other, the terminals 22 on the male connector 2 pass through the holes formed in the holding portion 4 and make contact with the terminals of the female connector 1.

As shown in FIG. 3, slider 5A and slider 5B are arranged inside the female connector 1. Slider 5A is connected to the upper side wall of the housing 1 (the left side in FIG. 3) and slider 5B is connected to the lower side wall of the housing 10 (the right side in FIG. 3). Slider 5A and slider 5B each have a surface 5a facing the other in the vertical direction with the holding portion 4 interposed between the sliders 5. A pressing portion 51 is provided on each surface 5a for pushing the hood portion 21 towards the holding portion 4. An accommodating space S is provided between the holding portion 4 and each slider 5 for accommodating the hood portion 21 of the male connector 2 (see FIG. 1). When the operator connects the female connector 1 and the male connector 2 to each other, the hood portion 21 of the male connector 2 enters the accommodating spaces S and the accommodated holding portion 4a of the holding portion 4 is accommodated inside the hood portion 21.

FIG. 4 and FIG. 5 are perspective views showing the interior of the housing 10. In these examples, the holding portion 4 has been removed. As shown in FIG. 4 through FIG. 6, each slider 5 has a plurality of groove portions 52. More specifically, the groove portions 52 are formed side-by-side in the sliders 5 in the transverse direction. Each groove portion 52 is connected at the rear end of the slider 5, and extends to the front end as far as the temporary engaging position 56 near the front end. They then extend at an angle to the permanent engaging position 57 at the front and left end. Each groove portion 52 engages an engaging portion 23 (see FIG. 1) formed on the outer surface of the hood portion 21. Moving the sliders 5 in the transverse direction guides the hood portion 21 (see FIG. 1) in the direction connecting the male connector 2 to the female connector 1.

As shown in FIG. 4 and FIG. 5, the sliders 5 are able to slide in the transverse direction. More specifically, by rotating the lever 3 around the support shaft portion 33, the sliders 5 are pushed against the extended portion 34 formed in the lever 3 (see FIG. 1) and slide in the transverse direction.

In the example shown in FIG. 4, the lever 3 is in the release position and the sliders 5 are positioned in the release position on the left side of the female connector 1. At this time, the rear ends of each groove portion 52 are connected to the guide grooves 13 formed in the rear end surface of the housing 10. The operator can then insert the male connector 2 into the female connector 1 to temporarily engage the female connector 1 and the male connector 2. More specifically, the engaging portions 23 formed in the hood portion 21 of the male connector 2 pass through the guide grooves 13 of the housing 10 and move towards the temporary engaging positions 56 of the sliders 5. Here, a temporary engaging portion 53, which is a projection protruding inward from the housing 10 is formed in the bottom surface of each groove portion 52. The engaging portions 23 on the male connector 2 catch the temporary engaging portions 53, and the male connector 2 is temporarily engaged. In other words, the temporary engaging portions 53 prevent the operator from unintentionally detaching the male connector 2.

In the example shown in FIG. 5, the lever 3 is in the locked position. In this position, the sliders 5 are arranged in the locked position on the right side of the female connector 1. In other words, when the lever 3 is operated, the sliders 5 slide in the transverse direction between the release position and the locked position. When the sliders 5 slide from the release position to the locked position, force is applied to the hood portion 21 in the direction in which the male connector 2 is connected to the female connector 1. More specifically, the engaging portions 23 inserted into the temporary engaging position 56 move along the groove portions 52 to the permanent engaging position 57 positioned in front of and to the left of the temporary engaging position 56. When the sliders 5 have pushed the hood portion 21 to the front side of the housing 10, the female connector 1 and the male connector 2 have been mated.

Also, when the lever 3 is biased from the locked position towards the release position and the sliders 5 are slid to the release position, force is applied to the hood portion 21 in the direction disengaging the female connector 1 and the male connector 2 from each other. More specifically, the engaging portions 23 arranged in the permanent engaging positions 57 are guided to the temporarily engaging positions 56 to the rear, the hood portion 21 is pushed to the rear of the housing 10, the female connector 1 and the male connector 2 in the temporary engaging positions are separated, and the female connector 1 is disengaged from the male connector 2.

When the operator moves the sliders 5 in the transverse direction using the lever 3, the engaging portions 23 and the male connector 2 are pushed in the longitudinal direction. Because the lever 3 acts in principle like a force multiplier with the support shaft portion 33 serving as the fulcrum, the operator can detach the connectors from each other using less force than used to directly insert the male connector 2 into the female connector 1.

In order to mate the female connector 1 with the male connector 2, the distance that the sliders 5 move in the transverse direction is greater than the distance that the hood 21 moves in the longitudinal direction. Because the distance moved by the operator is longer than the distance moved by the hood portion 21, a force multiplier function occurs due to the difference in distances. In other words, by using sliders 5, the operator can mate the connectors with each other by exerting a fairly small amount of force.

In the example shown in FIG. 4, a first hole 54 is formed in any of the groove portions 52, and a button portion 15 with a square protruding tip protrudes from the first hole 54. In the example shown in FIG. 4, the hood portion 21 is not inserted, and the sliding of the sliders 5 and the rotation of the lever 3 are limited when the button portion 15 catches the edge of the first hole 54. When the hood portion 21 is inserted and the engaging portions 23 are arranged in the temporary engaging positions 56, the button portion 15 is pushed in by an engaging portions 23 and moves to a position where it does not catch on the edge of the first hole 54. In other words, when the male connector 2 is inserted to the temporary engaging position, the restriction on the slider 5 and the lever 3 is released. When the sliders 5 are arranged at the locked position as shown in FIG. 5, the button portion 15 is inserted into a second hole 55 formed in front of the first hole 54.

Also, as shown in FIG. 4 through FIG. 6, the pressing portions 51 formed in the sliders 5 are formed on both ends of the sliders 5 in the transverse direction. A plurality of pressing portions 51 are also formed at a predetermined interval from each other in the sliders 5 in the transverse direction. Each of the pressing portions 51 is arranged in the same position in the longitudinal direction. In the present embodiment, the pressing portions 51 are arranged in the same position as the permanent engaging position 57 in the longitudinal direction. In other words, the pressing portions 51 are arranged in the center or near the center of a line connecting two permanent engaging positions 57. When the sliders 5 slide in the transverse direction and the male connector 2 moves in the direction connecting it to the female connector 1, the pressing portions 51 press against the outer surface of the hood portion 21.

Also, as shown in FIG. 6, each pressing portion 51 has an inclined surface 51a extending at an angle from the rear side towards the front side (that is, the X1 side) and the lower side (that is, the Z1 side) and an inclined surface 51b extending at an angle from the front side towards the rear side (that is, in the X2 direction) and the lower side. The hood portion 21 moves in the longitudinal direction as the outer surface makes contact with the pressing portions 51, but the inclined surfaces in the pressing portions 51 reduce the friction generated when the hood portion 21 moves in the longitudinal direction, making the hood portion 21 easy to insert or the hood portion 21 easy to detach. The inclined surface 51a especially reduces the resistance when the front edges 21e, 21f formed in the upper and lower side panels 21a, 21b have overcome the pressing portions 51.

Each pressing portion 51 also has an inclined surface 51c extending from the left side at an angle towards the right side (that is, the Y1 side) and the lower side, and an inclined surface 51d extending from the right side at an angle towards the left side (that is, the Y2 side) and the lower side. Because the pressing portions 51 have these inclined surfaces, the resistance generated by the pressing portions 51 when the sliders 5 are moved in the transverse direction can be reduced.

Also, as shown in FIG. 7, a recessed portion 59 is formed in the rear surface 5b of a slider 5. The lever 3 attached to the female connector 1 has an extended portion 34 in the direction facing the slider 5 from the hood portion 21 (that is, the vertical direction; see FIG. 1 and FIG. 8), and the recessed portion 59 in the slider 5 engages the leading end of the extending portion 34. When the lever 3 is rotated, the edge of the recessed portion 59 is pushed up by the extended portion 34 and the slider 5 slides in the transverse direction.

As shown in the cross-sectional view in FIG. 8, when the female connector 1 and the male connector 2 are connected, the accommodated holding portion 4a of the holding portion 4 holding the terminals (not shown) of the female connector 1 is accommodated inside the hood portion 21. Also, when the female connector 1 and the male connector 2 are connected in this manner, the seal 41 is interposed between the outer surface of the holding portion 4 and the inner surface of the hood portion 21. In this way, the seal 41 closes the gap between the holding portion 4 and the hood portion 21, and the female connector 1 and the male connector 2 are waterproof.

When the holding portion 4 is arranged inside the hood portion 21 in this manner, the sliders 5 are arranged on the outside surface of the hood portion 21. As mentioned above, pressing portions 51 are formed in the sliders 5 to press the hood portion 21 towards the holding portion 4. When the holding portion 4 is arranged inside the hood portion 21, the pressing portions 51 are arranged at a position closer to the open leading end of the hood portion 21 (that is, to the front of the seal 41) than the position where the seal 41 is arranged.

When the pressing portions 51 are arranged in this position and the engaging portions 23 of the male connector 2 are in the temporary engaging positions 56, the hood portion 21 does not reach the pressing portions 51 and the pressing portions 51 are not pressed against the hood portion 21. As a result, very little resistance is met when the female connector 1 and the male connector 2 are connected to the temporary engagement or disconnected from temporary engagement.

Afterwards, when the sliders 5 move in the transverse direction, the hood portion 21 is moved to the mated position, and the front edges 21e, 21f of the hood portion 21 overcome the pressing portions 51. Because the pressing portions 51 have inclined surfaces 51a, the front edges 21e, 21f easily overcome the pressing portions 51.

Because the inside surface of the hood portion 21 makes contact with the seal 41, force is applied to the hood portion 21 so that it bulges outward. Here, the temporary outward bulging of the hood portion 21 reduces the close contact with the seal 41 and the waterproofing performance of the female connector 1 and the male connector 2 is reduced. However, the pressing portions 51 are formed in the sliders 5 positioned on the female connector 1. When the pressing portions 51 push the hood portion 21 outward, the bulging of the hood portion 21 is suppressed and the waterproof performance of the female connector 1 and the male connector 2 is maintained.

The recessed portion 59 formed in the slider 5 engages the extended portion 34 formed in the support column portion 32 of the lever 3. When the female connector 1 and the male connector 2 are connected, force is applied to the slider 5 in the direction away from the hood portion 21 via the pressing portions 51. Here, the end surface 34a formed in the leading end of the extended portion 34 formed in the lever 3 comes into contact with the bottom surface of the recessed portion 59 formed in the slider 5 in the vertical direction (the transverse direction in FIG. 8) extending from the hood portion 21 to the slider 5. This can keep the slider 5 from moving away from the hood portion 21 and suppress the bulging of the female connector 1 itself.

The sliders 5 may be detached from the housing 10. If necessary, they may be replaced with different sliders (for example, sliders with a different height in the longitudinal direction, sliders with pressing portions 51 in different positions, or sliders with pressing portions 51 absent in certain positions). By increasing the thickness of the sliders 5 in the vertical direction, deformation of the sliders 5 themselves can be suppressed.

When the operator mates the female connector 1 with the male connector 2, the seal 41 and the pressing portions 51 make contact with the hood portion 21, causing frictional resistance. However, because the lever 3 and the sliders 5 have a force multiplying effect due to their structure, the operator can mate the female connector 1 with the male connector 2 fairly easily.

The present disclosure is not restricted to the embodiments explained above. Many different variations and modifications are possible. For example, in the present embodiments, the pressing portions 51 formed on the sliders 5 are formed on the surface of the sliders 5. However, pressing portions 51 may be formed simply by increasing the vertical-direction thickness of the sliders 5 in various places.

In the embodiments explained above, the structure used to guide the hood portion 21 in the direction in which the male connector 2 is connected to the female connector 1 consisted of groove portions 52 formed in the sliders 5. However, the grooves may be formed in the hood portion 21. In this case, protrusions are formed in the sliders 5 to engage the grooves in the hood portion 21.

In the embodiments explained above, the lever 3 on the female connector 1 slides the sliders 5 in the transverse direction. However, the female connector 1 does not have to include a lever 3. The sliders 5 may slide in the transverse direction when the hood portion 21 is inserted into the housing 10. Because the difference in the moving distance of the hood portion 21 and the sliders 5 gives the sliders 5 a force multiplying effect as mentioned above, the connectors can be mated by the operator using very little force even when a lever 3 is not used.

In the embodiments explained above, the pressing portions 51 have four inclined surfaces. However, the protruding portions can have any shape that reduces the sliding friction of the sliders 5 and enables the front edges 21e, 21f of the hood portion 21 to overcome the protruding portions. For example, the pressing portions 51 may be low, dome-shaped protrusions.

The disclosures in the present specification are merely examples of the present disclosure. A person skilled in the art could easily make modifications while preserving the essentials of the present disclosure, and these modifications fall within the scope of the claims. The width, thickness, and shape of each component in the drawings are schematic illustrations and do not limit the interpretation of the present disclosure.

The invention claimed is:

1. A first connector configured to be fully mated in a first direction to a second connector, the second connector having a cylindrical hood open in the first direction, the cylindrical hood housing on an inside thereof a plurality of terminals, the first connector comprising:
   a holding portion configured to hold the plurality of terminals inside the hood when the first connector is fully mated to the second connector;
   a seal positioned about an outer surface of the holding portion, the seal configured to be interposed between the outer surface of the holding portion and an inner surface of the hood when the first connector is fully mated to the second connector;
   a slider configured to be arranged along an outer surface of the hood when the holding portion is housed inside the hood, the slider configured to slide in a second direction orthogonal to the first direction and to engage the hood so that the slider sliding in the second direction causes the second connector to apply pressing force to the hood in the direction of connection to the first connector, thereby fully mating the first connector to the second connector; and
   a pressing portion formed in the slider, the pressing portion configured to press the hood toward the holding portion when the first connector is fully mated to the second connector.

2. The first connector according to claim 1, wherein the slider has a plurality of pressing portions arranged at a predetermined interval from each other in the second direction serving as the pressing portion.

3. The first connector according to claim 1, wherein the slider is configured to engage an engaging portion provided on the outer surface of the hood when the first connector is fully mated to the second connector, and wherein the slider has a plurality of grooves configured to guide the holding portion into the hood when the slider moves in the second direction.

4. The first connector according to claim 1, wherein the pressing portion is configured to be arranged at a position closer to a leading end opening into the hood than a position where the seal is arranged.

5. The first connector according to claim 1, wherein the pressing portion protrudes in a third direction orthogonal to the first direction and the second direction, and wherein the pressing portion has an inclined surface extending in the first direction and the third direction.

6. The first connector according to claim 1, wherein the pressing portion protrudes in a third direction orthogonal to the first direction and the second direction, and wherein the pressing portion has an inclined surface extending in the second direction and the third direction.

7. The first connector according to claim 1, wherein the first connector has two sliders serving as the slider, the two sliders each having a surface facing the other in a third direction orthogonal to the first direction and the second direction so as to interpose the holding portion, and wherein the pressing portion is formed on surfaces of the two sliders facing each other.

8. A connector assembly comprising:
   a first connector having a holding portion, a seal, a slider and a pressing portion, the seal being positioned about an outer surface of the holding portion, the pressing portion being formed in the slider; and
   a second connector having a cylindrical hood open in a first direction, the cylindrical hood housing on an inside thereof a plurality of terminals,
   wherein the first connector is configured to be fully mated in the first direction to the second connector, and wherein, when the first connector is fully mated to the second connector:
      the holding portion holds the plurality of terminals inside the hood,
      the seal being is interposed between the outer surface of the holding portion and an inner surface of the hood,
      the slider is arranged along an outer surface of the hood, the slider being slidable in a second direction orthogonal to the first direction and engaging the hood so that the slider sliding in the second direction causes the second connector to apply pressing force to the hood in the direction of connection to the first connector, thereby fully mating the first connector to the second connector; and
      the pressing portion presses the hood toward the holding portion.

9. The connector assembly according to claim 8, wherein the pressing portion presses against the outer surface of the hood as the slider slides in the second direction and the second connector moves in the direction connecting to the first connector.

10. The connector assembly according to claim 9, wherein the pressing portion does not apply pressure to the outer surface of the hood when the hood is housed inside the first connector but the slider sliding in the second direction has not moved the second connector in the direction connecting to the first connector.

* * * * *